United States Patent
Lee et al.

(10) Patent No.: US 10,218,061 B2
(45) Date of Patent: Feb. 26, 2019

(54) WIRELESS COMMUNICATIONS ANTENNA AND WIRELESS COMMUNICATIONS DEVICE USING THE SAME

(71) Applicant: Samsung Electro-Mechanics Co., Ltd., Suwon-si (KR)

(72) Inventors: Tae Heon Lee, Suwon-si (KR); Hyeon Gil Nam, Suwon-si (KR); Choon Hee Kim, Suwon-si (KR); Hyun Do Park, Suwon-si (KR); Dae Seong Jeon, Suwon-si (KR); Nam Ki Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/817,700

(22) Filed: Nov. 20, 2017

(65) Prior Publication Data
US 2018/0301794 A1    Oct. 18, 2018

(30) Foreign Application Priority Data

Apr. 12, 2017    (KR) .................. 10-2017-0047513

(51) Int. Cl.
*H04B 1/034*    (2006.01)
*H01Q 1/27*    (2006.01)
*H01Q 1/38*    (2006.01)
*H01Q 7/08*    (2006.01)

(52) U.S. Cl.
CPC ............... *H01Q 1/273* (2013.01); *H01Q 1/38* (2013.01); *H01Q 7/08* (2013.01); *H04B 1/0343* (2013.01)

(58) Field of Classification Search
CPC . H01Q 1/273; H01Q 1/38; H01Q 7/08; H04B 1/0343
USPC ......................................... 455/100
See application file for complete search history.

(56) References Cited

U.S. PATENT DOCUMENTS

| 8,466,791 B2 * | 6/2013 | Goto ................. H01Q 7/00 340/572.7 |
| 2005/0195689 A1 | 9/2005 | Oguchi |
| 2016/0254587 A1 | 9/2016 | Jung et al. |

FOREIGN PATENT DOCUMENTS

| KR | 10-0722083 B1 | 5/2007 |
| KR | 10-2010-0048273 A | 5/2010 |
| WO | 2005/0195689 A1 | 9/2016 |

* cited by examiner

*Primary Examiner* — Sanh D Phu
(74) *Attorney, Agent, or Firm* — NSIP Law

(57) ABSTRACT

A wireless communications antenna includes a first coil including first conductive patterns disposed on a first layer along a first axis and a second coil including second conductive patterns disposed on a second layer along a second axis having a direction different from a direction of the first axis.

12 Claims, 10 Drawing Sheets

WIRELESS COMMUNICATIONS ANTENNA AND WIRELESS COMMUNICATIONS DEVICE USING THE SAME

CROSS-REFERENCE TO RELATED APPLICATION(S)

This application claims the benefit under 35 USC § 119(a) of Korean Patent Application No. 10-2017-0047513 filed on Apr. 12, 2017, in the Korean Intellectual Property Office, the entire disclosure of which is incorporated herein by reference for all purposes.

BACKGROUND

1. Field

The following description relates to a wireless communications antenna and to a wireless communications device using the same.

2. Description of Related Art

Wireless communications have been adapted to be able to be used in varying environments. Specifically, coil-type wireless communications antennas related to electronic payment transfer schemes have been adapted for use in a variety of devices.

Recently, wireless information transmission devices using coils have also been used in electronic devices, such as mobile devices and wearable devices.

Relatively large mobile devices typically employ spiral coil-type wireless communications antennas attached to the covers of mobile devices, or the like.

As wearable devices are becoming more and more common, demand for wireless communications antennas appropriate for use in wearable devices and mobile devices has increased.

Wireless communications antennas used in wearable devices are subject to narrow ranges of a radiation direction and a radiation range for reliability of data transmission and user convenience. Recently, research into miniaturization and mass-production of wireless communications antennas embedded in relatively small wearable devices has been ongoing.

SUMMARY

This Summary is provided to introduce a selection of concepts that are further described below in the Detailed Description in simplified form. This Summary is not intended to identify key features or essential features of the claimed subject matter, nor is it intended to be used as an aid in determining the scope of the claimed subject matter.

In one general aspect, A wireless communications antenna includes a first coil including first conductive patterns disposed on a first layer along a first axis and a second coil including second conductive patterns disposed on a second layer along a second axis having a direction different from a direction of the first axis.

The wireless communications antenna may further include a magnetic material layer comprising a magnetic material.

The first layer may be disposed on the magnetic material layer. The first coil may further include third conductive patterns disposed on a third layer disposed below the magnetic material layer along the first axis and first via electrodes electrically connecting the first conductive patterns to the third conductive patterns.

The second layer may be disposed under the magnetic material layer. The second coil may further include fourth conductive patterns disposed on a fourth layer disposed on the magnetic material layer along the second axis and second via electrodes electrically connecting the second conductive patterns to the fourth conductive patterns.

The first coil may be a solenoid coil using the magnetic material layer as a core.

The second coil may be a solenoid coil using the magnetic material layer as a core.

The first axis may be perpendicular to the second axis.

The first conductive pattern may be disposed on an upper surface of a first substrate layer. A fourth conductive pattern may be disposed on a lower surface of the first substrate layer. One of a third or the second conductive pattern may be disposed on an upper surface of a second substrate layer, the second substrate layer being disposed below the first substrate layer. The other of the third or second conductive pattern is disposed on a lower surface of the second substrate layer. A magnetic material layer may be disposed between the first substrate layer and the second substrate layer and comprises a magnetic material.

When the third conductive pattern is disposed on the upper surface of the second substrate layer, the first conductive pattern may be electrically connected to the third conductive pattern by via electrodes to form the first coil, and the second conductive pattern may be electrically connected to the fourth conductive pattern by via electrodes to form the second coil.

When the second conductive pattern is disposed on the upper surface of the second substrate layer, the first conductive pattern may be electrically connected to the third conductive pattern by via electrodes to form the first coil, and the second conductive pattern may be electrically connected to the fourth conductive pattern by via electrodes to form the second coil.

In another general aspect, a wireless communications device includes a wireless communications antenna comprising a first coil and a second coil, the first coil and the second coil based on different axes and a wireless communications controller configured to control the wireless communications antenna to allow the wireless communications antenna to wirelessly transmit information by transmitting an information signal to the wireless communications antenna.

A communications area configured to be formed by the first coil may be different from a communications area configured to be formed by the second coil.

The first coil may include first conductive patterns disposed on a first layer along a first axis and the second coil may include second conductive patterns disposed on a second layer and formed along a second axis different from the first axis.

The wireless communications device may include a magnetic material layer including a magnetic material. The first layer may be disposed on the magnetic material layer. The first coil may further include third conductive patterns disposed on a third layer disposed below the magnetic material layer along the first axis and first via electrodes electrically connecting the first conductive patterns to the third conductive patterns.

The first conductive pattern may be disposed on an upper surface of a first substrate layer. A fourth conductive pattern may be disposed on a lower surface of the first substrate layer. One of a third or the second conductive pattern may be disposed on an upper surface of a second substrate layer, the second substrate layer being disposed below the first substrate layer. The other of the third or second conductive pattern may be disposed on a lower surface of the second substrate layer. A magnetic material layer may be disposed between the first substrate layer and the second substrate layer and may include a magnetic material.

When the third conductive pattern is disposed on the upper surface of the second substrate layer, the first conductive pattern may be electrically connected to the third conductive pattern by via electrodes to form the first coil, and the second conductive pattern may be electrically connected to the fourth conductive pattern by via electrodes to form the second coil.

When the second conductive pattern is disposed on the upper surface of the second substrate layer, the first conductive pattern may be electrically connected to the third conductive pattern by via electrodes to form the first coil, and the second conductive pattern may be electrically connected to the fourth conductive pattern by via electrodes to form the second coil.

Other features and aspects will be apparent from the following detailed description, the drawings, and the claims.

Figure 1:
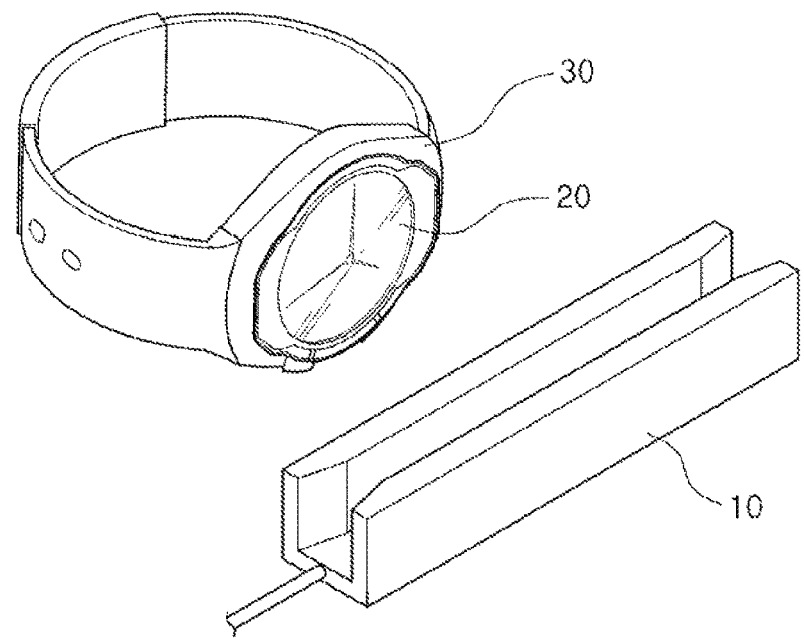
FIG. 1 is a perspective view illustrating an example of a wearable device performing wireless communications.

Throughout the drawings and the detailed description, the same reference numerals refer to the same elements. The drawings may not be to scale, and the relative sizes, proportions, and depictions of elements in the drawings may be exaggerated for the purpose of clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a perspective view of an example of a wearable device for performing wireless communications.

The wearable device may be an electronic device worn on a human body, such as an arm or a head, or fixed to a specific body part by a strap. Hereinafter, a case in which the wearable device in an example has a form of a watch worn on a wrist is used as an example, but is not limited thereto.

A wireless communications antenna 20 is applied to a wearable device 30. The wireless communications antenna 20 may form a magnetic field controlled by of the wearable device 30.

The wireless communications antenna 20 may operate as a transmission coil. The wireless communications antenna 20 may be magnetically coupled to a wireless signal receiving device including a reception coil, thereby wirelessly transmitting information to the receiving device.

FIG. 1 illustrates a magnetic card reader 10 as a wireless signal receiving device including a reception coil. According to an example, various wireless signal receiving devices may be used as a device including a reception coil, in addition to or in the alternative of the magnetic card reader 10.

The wireless communications antenna 20 forms an expanded magnetic field using the transmission coil when magnetically coupled to the magnetic card reader 10, even in the case in which a position or an angle of the reception coil of the magnetic card reader 10 is changed.

The wireless communications antenna 20 may include a plurality of coils, each coil having different axes, and each coil having different wireless communications areas. Thus, the wireless communications antenna 20 may expand a communications area by using a plurality of coils in which each coil has a different communications area.

The wireless communications antenna 20 may transmit data to be transmitted to the magnetic card reader 10, for example, card number data, by converting a direction of a magnetic field. In other words, the magnetic card reader 10 may generate the card number data using a change in a voltage between an anode input terminal and a cathode input terminal of the reception coil, caused by conversion of the direction of the magnetic field formed in the wireless communications antenna 20.

Hereinafter, with reference to FIGS. 2 and 3, magnetic coupling between a wireless communications antenna and a magnetic card reader and an operation of the magnetic card reader will be described in more detail.

Figure 2:
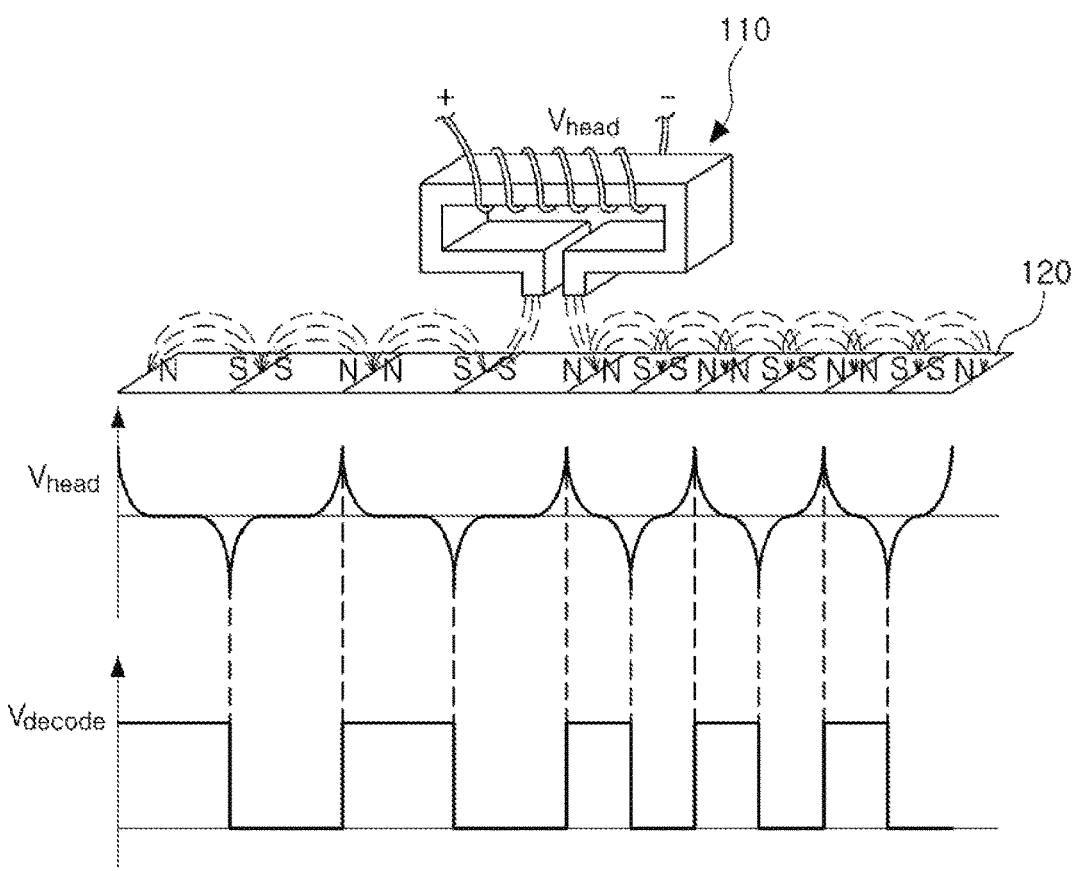
FIG. 2 is a diagram illustrating a voltage between an anode input terminal and a cathode input terminal of an exemplary magnetic head disposed to be adjacent to a magnetic card.

FIG. 2 is a diagram of a voltage between an exemplary anode input terminal and a cathode input terminal of a magnetic head disposed to be adjacent to a magnetic card.

A magnetic card reader (10 in FIG. 1) includes a magnetic head 110 and an analogue-digital (AD) converter (not illustrated). The magnetic head 110 may generate a voltage through magnetic flux. In other words, the magnetic head 110 may include a reception coil and may detect a voltage Vhead between an anode input terminal and a cathode input terminal, generated on opposing ends of the reception coil by a magnetic field.

When the reception coil is present in the magnetic field, the voltage Vhead between an anode input terminal and a cathode input terminal is generated in the reception coil by the magnetic flux.

The generated voltage Vhead between an anode input terminal and a cathode input terminal may be supplied to the AD converter, while the AD converter may generate a decoding signal Vdecode from the voltage Vhead between an anode input terminal and a cathode input terminal. The decoding signal Vdecode may be provided as a digital voltage signal, so card information data may be generated from the decoding signal Vdecode.

A magnetic stripe 120, having been magnetized, is present in the magnetic card. While the magnetic head 110 is moved above the magnetic stripe 120, the voltage Vhead between an anode input terminal and a cathode input terminal is generated in the reception coil of the magnetic head 110 by the magnetic flux.

The voltage Vhead between an anode input terminal and a cathode input terminal may have a peak voltage in accordance with a polarity of the magnetic stripe 120. For example, in a case in which the same polarities are disposed to be adjacent to each other, the peak voltage may be generated in the voltage Vhead between an anode input terminal and a cathode input terminal.

The AD converter may generate the decoding signal Vdecode from the voltage Vhead between an anode input terminal and a cathode input terminal. In detail, whenever the peak voltage is detected, the AD converter may generate the decoding signal Vdecode by generating an edge.

Since the decoding signal Vdecode is provided as a digital voltage signal, digital data may be decoded therefrom. For example, according to a length of a cycle of the decoding signal Vdecode, '1' or '0' may be decoded. In the illustrative example shown in FIG. 2, it can be confirmed that a first cycle and a second cycle of the decoding signal Vdecode are equal to double a third cycle. Thus, the first cycle and the second cycle of the decoding signal Vdecode may be decoded as '1', while the third cycle, a fourth cycle, and a fifth cycle may be decoded as '0'. A decoding method described above is merely an example, and various decoding methods may be applied thereto.

FIG. 2 illustrates an example in which the magnetic card reader 10 performs decoding from the magnetic stripe 120. The magnetic head 110 may generate the voltage Vhead between an anode input terminal and a cathode input terminal from a magnetic field, generated in the wireless communications antenna, as well as the magnetic stripe 120. In other words, the magnetic head 110 of the magnetic card reader 10 may be magnetically coupled to a transmission coil of the wireless communications antenna, thereby receiving data, for example, card number data.

Figure 3:
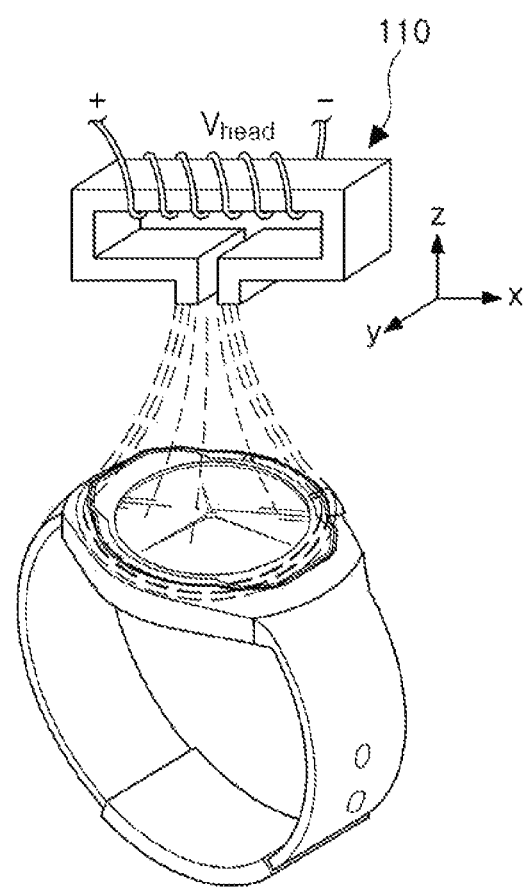
FIG. 3 is a diagram illustrating an example in which the magnetic head of a magnetic card reader is magnetically coupled to a wireless communications antenna.

FIG. 3 is a diagram illustrating an example of the magnetic head of a magnetic card reader being magnetically coupled to a wireless communications antenna.

The wireless communications antenna may include a magnetic material as a core and may include a solenoid-type coil wound around the magnetic material.

That is, the wireless communications antenna may include a solenoid coil having an axis in a direction parallel with a body of a wearable device. In an example, the wireless communications antenna may include solenoid coils having different axes. For example, the wireless communications antenna may include a solenoid coil having an S1 axis and a solenoid coil having an S2 axis. A winding axis described above will be described in more detail in FIGS. 4 to 5.

As such, the plurality of solenoid coils may be included based on a respective plurality of axes in parallel with the body of the wearable device, thereby stably performing wireless communications at any angle between a mobile device and the magnetic head 110.

Figure 4:
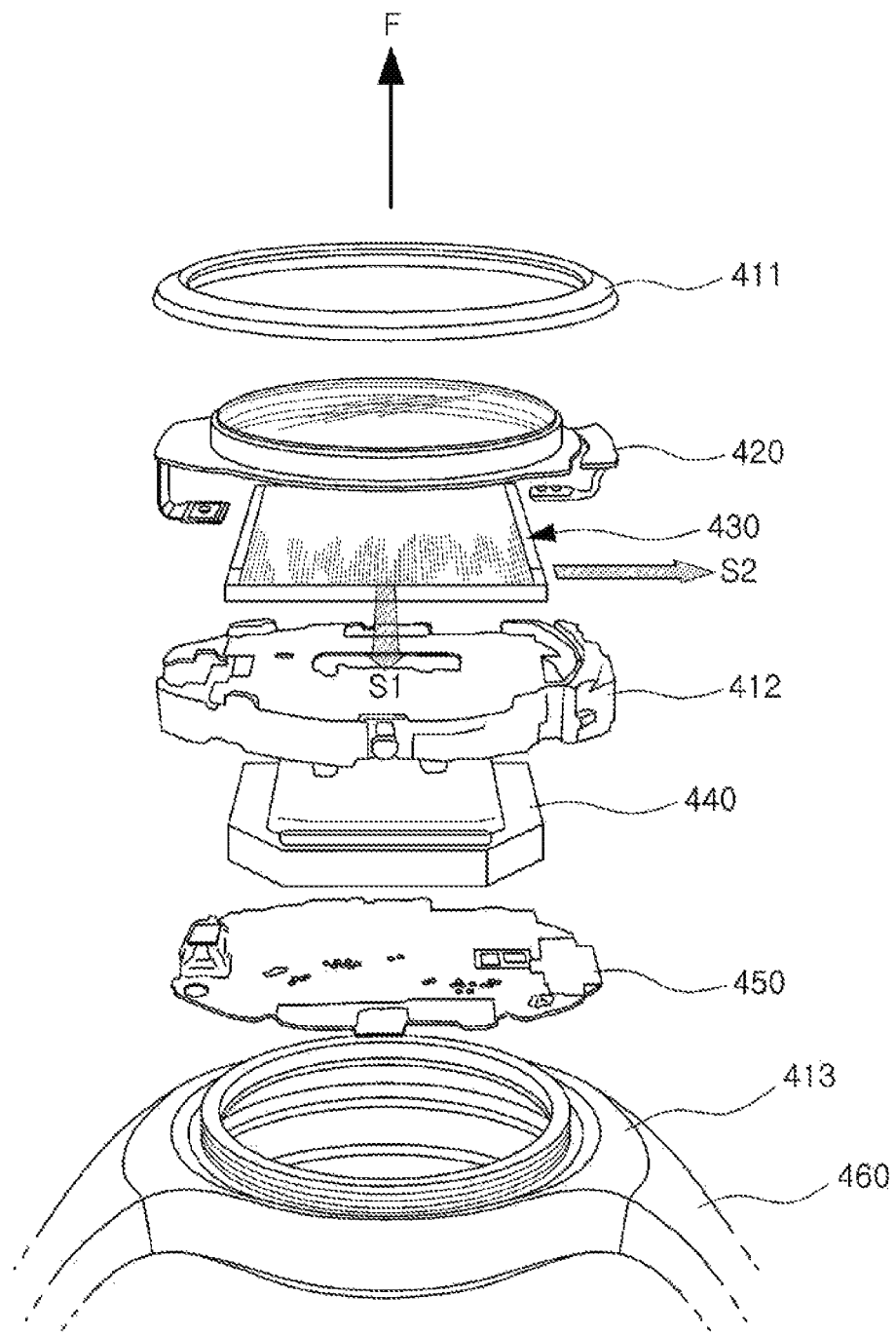
FIG. 4 is an exploded perspective view of the wearable device of FIG. 1.

FIG. 4 is an exploded perspective view of an example of a wearable device.

With reference to FIG. 4, the wearable device includes case components 411, 412, and 413, a display 420, a wireless communications antenna 430, a battery 440, and a main substrate 450.

The wearable device may include a strap 460 for a user to wear the wearable device. A case may include a display housing 411, a battery case 412, and a main body 413.

The display 420 may be disposed to face a front surface of the case and may visualize an electronic signal to provide a user with visual information. In an example, the display 420 may include a touchscreen panel receiving a touch input from a touch object, such as a finger.

The battery 440 supplies power to the wearable device to operate the wearable device. The battery 440 may be embedded in the battery case 412 and may be charged using a wireless charging method.

The main substrate 450 may include a control circuit controlling the wearable device embedded therein. The main substrate 450 may include a wireless communications control unit embedded therein, while the wireless communications control unit may control an operation of the wireless communications antenna 430.

The strap 460 may be provided as two separate straps, each of which may be connected to the main body. In a case in which the strap 460 may have a single integral form, the strap 460 may surround the main body 413.

The wireless communications antenna 430 may receive an information signal from the wireless communications control unit embedded in the main substrate 450, thereby directing the wireless communications antenna 430 to generate a magnetic field. In other words, the wireless communications antenna 430 may be provided as a transmission coil and may radiate magnetic pulses. In detail, the wireless communications antenna 430 may have a radiation direction perpendicular to a direction F in which a front surface of the case 411 is oriented. That is, a radiation direction includes an S1 axis and an S2 axis, in parallel with a body of the wearable device.

The wireless communications antenna 430 may include solenoid coils formed using a multilayer substrate. For example, the wireless communications antenna 430 may include a plurality of layers. The wireless communications antenna 430 may include a first coil including a plurality of conductive patterns formed on one or more layers among the plurality of layers, and having a first axis (e.g., the S1 axis illustrated); and a second coil including a plurality of conductive patterns formed on one or more different layers among the plurality of layers, and formed based on a second axis (e.g., the S2 axis illustrated) having a direction different from that of the first axis.

In the same manner as an example described in FIG. 3, the wireless communications antenna 430 may be magnetically coupled to a wireless signal receiving device including a reception coil, thereby wirelessly transmitting information. Here, the information may be provided as magnetic stripe data of a magnetic card.

In FIG. 4, the wireless communications antenna 430 is illustrated as being embedded between the display 420 and the battery case 412, but a position at which the wireless communications antenna 430 is embedded may be changed.

Hereinafter, the wireless communications antenna 430 may be described in more detail with reference to FIGS. 5 to 10B.

Figure 5:
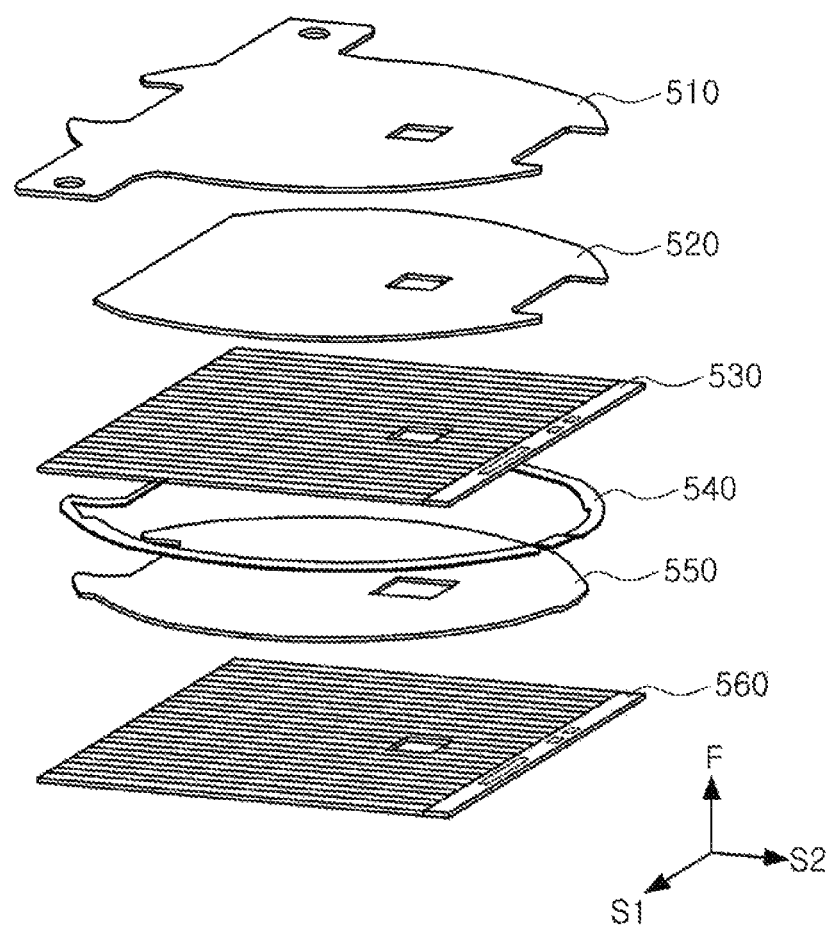
FIG. 5 is an exploded perspective view illustrating an example of a wireless communications antenna.

FIG. 5 is an exploded perspective view illustrating an example of a wireless communications antenna.

With reference to FIG. 5, the wireless communications antenna includes a plurality of layers. Accordingly, the wireless communications antenna is formed as a multilayer substrate including a plurality of layers.

The wireless communications antenna may include a carrier film 510, a bonding layer 520, a first substrate layer 530, an epoxy layer 540, a magnetic material layer 550, and a second substrate layer 560.

The carrier film 510 may be bonded to a surface of the bonding layer 520. The carrier film 510 may allow the wireless communications antenna to be moved or may allow the wireless communications antenna to be fixed to a wearable device 30.

A conductive pattern forming a coil may be formed on the first substrate layer 530 and the second substrate layer 560. As an example, each of the first substrate layer 530 and the second substrate layer 560 include the conductive pattern formed on one surface and the other surface thereof, thereby forming the conductive pattern on each of the opposing surfaces.

Conductive patterns formed on opposing surfaces of the first substrate layer 530 and conductive patterns formed on opposing surfaces of the second substrate layer 560 may be connected by a via electrode, thereby forming two solenoid-type coils.

A first coil may include a first conductive pattern formed on the magnetic material layer 550, a second conductive pattern formed below the magnetic material layer 550, and via electrodes electrically connecting the first conductive pattern to the second conductive pattern.

Similar to a case described above, a second coil may include a third conductive pattern formed on the magnetic material layer 550, a fourth conductive pattern formed below the magnetic material layer 550, and via electrodes electrically connecting the third conductive pattern to the fourth conductive pattern.

In other words, the magnetic material layer 550 may be formed between the first substrate layer 530 and the second substrate layer 560, and conductive patterns formed on the first substrate layer 530 and the second substrate layer 560 may be connected by the via electrodes, thereby forming two solenoid coils wound based on the magnetic material layer 550.

Two solenoid coils having different axes may be formed using the first substrate layer 530 and the second substrate layer 560, which will be described in more detail with reference to FIGS. 6A to 6B.

Figure 6A:
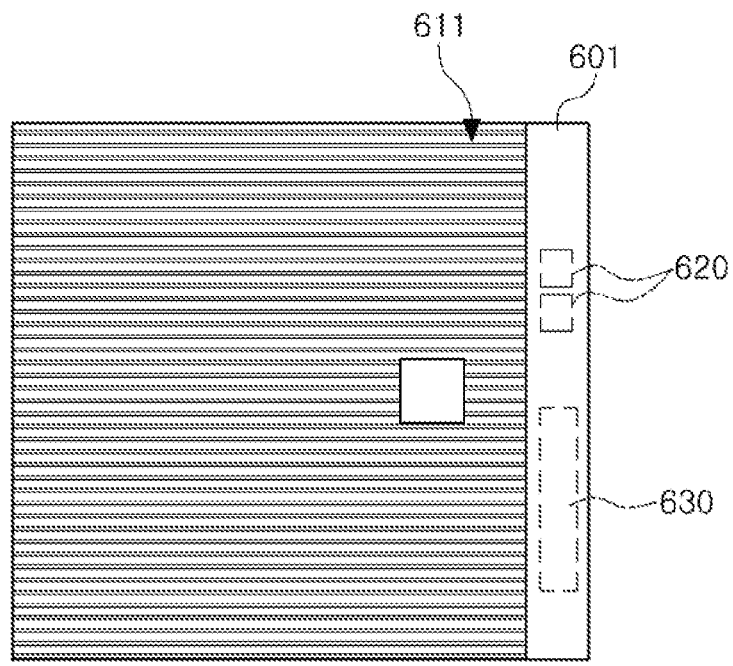
FIGS. 6A and 6B are diagrams illustrating an example of a substrate layer included in the wireless communications antenna illustrated in FIG. 5.
Figure 6B:
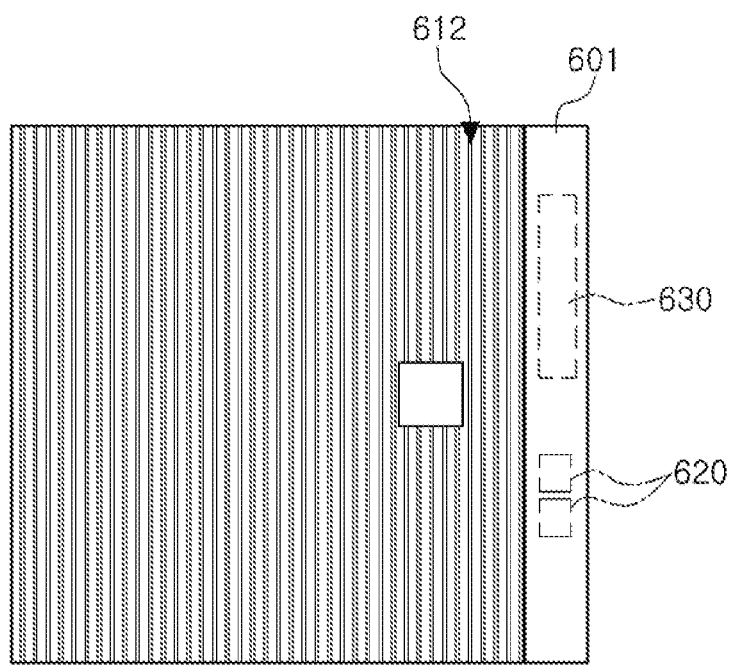

FIGS. 6A and 6B are views illustrating an example of a substrate layer included in the wireless communications antenna illustrated in FIG. 5. FIG. 6A is a top view illustrating an upper surface of a first substrate layer (530 of FIG. 5), and FIG. 6B is a bottom view illustrating a lower surface of the first substrate layer 530.

As illustrated in FIGS. 6A and 6B, the substrate layer 530 includes a substrate 601, a first conductive pattern 611 formed on one surface thereof, and a second conductive pattern 612 formed on the other surface thereof. According to an example, the substrate 601 further includes a contact terminal 620 and/or a filter circuit 630, disposed therein.

The first conductive pattern 611 includes conductive patterns formed in a first direction (a horizontal direction in an illustrated example). The second conductive pattern 612 includes conductive patterns formed in a second direction (a vertical direction in the illustrated example) different from the first direction. As such, conductive patterns formed in different length directions from each other are provided on opposing surfaces of the substrate layer 530. The substrate layers 530 may be provided on opposing surfaces of a magnetic material layer 550, and the conductive patterns formed in the same or similar direction may be connected to each other by via electrodes, thereby forming two solenoid coils, based on different axes.

In more detail, with reference to FIG. 5, a first conductive pattern is formed on an upper surface of a first substrate layer 530 disposed on the magnetic material layer 550. A third conductive pattern is formed on an upper surface of the second substrate layer 560 disposed below the magnetic material layer 550.

The first conductive pattern formed on the upper surface of the first substrate layer 530 and the third conductive pattern formed on the upper surface of the second substrate layer 560 are formed in length directions, respectively, different from a first axis S1.

Thus, in a case in which opposing ends of the first conductive pattern and opposing ends of the third conductive pattern may be electrically connected by the via electrodes, the first conductive pattern, the third conductive pattern, and the via electrodes may be a solenoid coil having the first axis S1 in such a manner that the magnetic material layer 550 is a core.

As shown in FIGS. 6A to 6B, a second conductive pattern is formed on a lower surface of the first substrate layer 530 at an angle different from that of the first conductive pattern formed on an upper surface thereof, that is, in a vertical direction, in an example illustrated in FIG. 6B.

As in the case described above, the second conductive pattern formed on the lower surface of the first substrate layer 530 and the fourth conductive pattern formed on a lower surface of the second substrate layer 560 are formed in length directions, different from a second axis S2.

Thus, in a case in which opposing ends of the second conductive pattern formed on the lower surface of the first substrate layer 530 and opposing ends of the fourth conductive pattern formed on the lower surface of the second substrate layer 560 may be electrically connected by the via electrodes, the second conductive pattern, the fourth conductive pattern, and the via electrodes may be a solenoid coil having the second axis S2 in such a manner that the magnetic material layer 550 is a core.

As such, the wireless communications antenna described above may have a plurality of coils having respective different axes using a plurality of layers. Since each coil has a different axis, areas of magnetic coupling are different. Thus, magnetic coupling may be provided using two coils at various angles without a shadow area.

Figure 7:
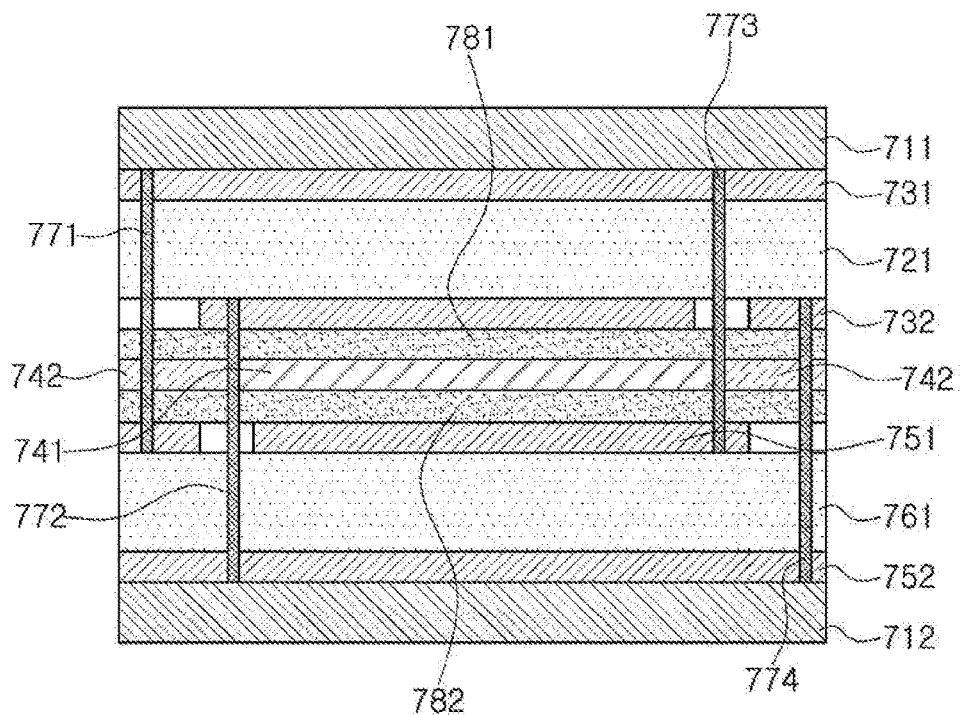
FIG. 7 is a cross-sectional view illustrating an example of a wireless communications antenna.

FIG. 7 is a cross-sectional view illustrating an example of a wireless communications antenna.

With reference to FIG. 7, the wireless communications antenna includes a magnetic material layer 741, a first substrate layer 721 stacked above the magnetic material layer 741, and a second substrate layer 761 stacked below the magnetic material layer 741.

An epoxy layer 742 is formed in an edge portion of the magnetic material layer 741. A first cover layer 711 and a second cover layer 712 are formed on an external side of each substrate layer.

A bonding layer 781 is formed between the magnetic material layer 741 and the first substrate layer 721, and a bonding layer 782 is formed between the magnetic material layer 741 and the second substrate layer 761, thereby allowing the first substrate layer 721 and the second substrate layer 761 to be fixed to the magnetic material layer 741.

A first conductive pattern 731 is formed on an upper surface of the first substrate layer 721, and a second conductive pattern 732 is formed on a lower surface of the first substrate layer 721. As described above, a direction of the first conductive pattern 731 is different from that of the second conductive pattern 732.

Like the case described above, a third conductive pattern 751 is formed on an upper surface of the second substrate layer 761, while a fourth conductive pattern 752 is formed on a lower surface of the second substrate layer 761. As described above, a direction of the third conductive pattern 751 is different from that of the fourth conductive pattern 752.

The first conductive pattern 731 is connected to the third conductive pattern 751 by a via electrode 771, thereby forming a first solenoid coil wound based on the magnetic material layer 741.

The second conductive pattern 732 is connected to the fourth conductive pattern 752 by a via electrode 772, thereby forming a second solenoid coil wound based on the magnetic material layer 741.

An axis of the first solenoid coil is different from that of the second solenoid coil, as described above.

FIG. 7 illustrates an example in which upper surfaces of respective substrate layers form a single coil, and lower surfaces thereof form a single coil; however, this is merely an example.

Figure 8:
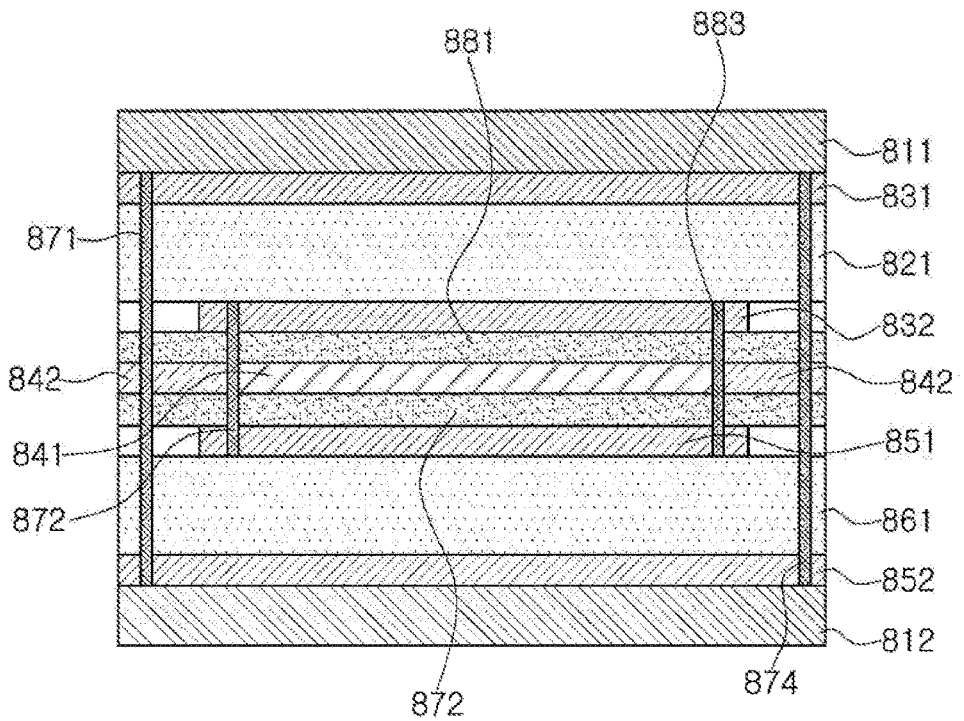
FIG. 8 is a cross-sectional view illustrating an example of a wireless communications antenna.

FIG. 8 is a cross-sectional view illustrating an example of a wireless communications antenna. With reference to FIG. 8, a wireless communications antenna includes a magnetic material layer 841, a first substrate layer 821 stacked above the magnetic material layer 841, a second substrate layer 861 stacked below the magnetic material layer 841, and bonding layers 881 and 882, provided on opposing surfaces of the magnetic material layer 841 to fix the first substrate layer 821 and the second substrate layer 861 to the magnetic material layer 841.

An epoxy layer 842, a first cover layer 811, a second cover layer 812, and bonding layers 881 and 882 may be understood by descriptions provided above with reference to FIG. 7.

A first conductive pattern 831 may be connected to a fourth conductive pattern 852 by a via electrode 871, thereby forming a first solenoid coil wound based on the magnetic material layer 841.

A second conductive pattern 832 is connected to a third conductive pattern 851 by a via electrode 882, thereby forming a second solenoid coil wound based on the magnetic material layer 841.

Descriptions provided above illustrate an example using two coils. However, through the descriptions provided above it may be understood that the wireless communications antenna may be formed using three or more coils.

In the examples described above, the wireless communications antenna is illustrated as having a quadrangular shape. However, this is merely an example, and the wireless communications antenna may be formed to have various shapes.

It is noted that although the first, second, third, and fourth conductive patterns described with reference to FIGS. 8 and 9 as stated above, references to "first," "second," "third" and "fourth" are arbitrary, and may be referred to in a way as to increase clarity. For example, the first conductive layer may refer to the upper layer of the first coil disposed on the upper side of the upper substrate, as shown in FIGS. 7 and 8. For example, the second conductive layer may refer to the lower layer of the second coil disposed on either the lower side of the lower substrate (FIG. 7), or on the upper side of the lower substrate (FIG. 8). For example, the third conductive layer may refer to the lower layer of the first coil disposed on either the upper side of the lower substrate (FIG. 7), or on the lower side of the lower substrate (FIG. 8). For example, the fourth conductive layer may refer to the upper layer of the second coil disposed on the lower side of the upper substrate, as shown in FIGS. 7 and 8.

Figure 9:
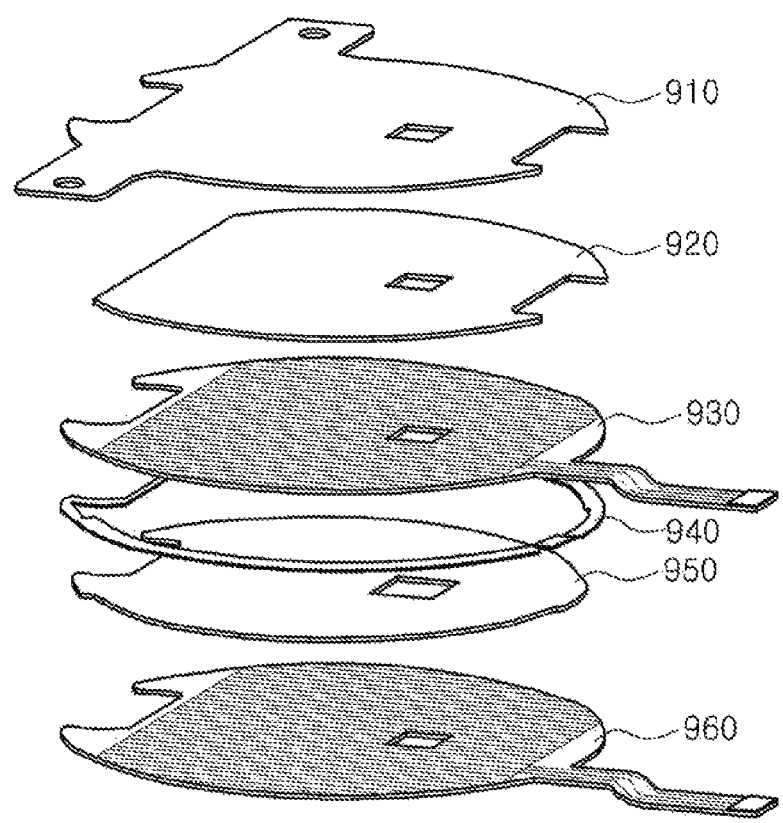
FIG. 9 is an exploded perspective view illustrating an example of a wireless communications antenna.
Figure 10A:
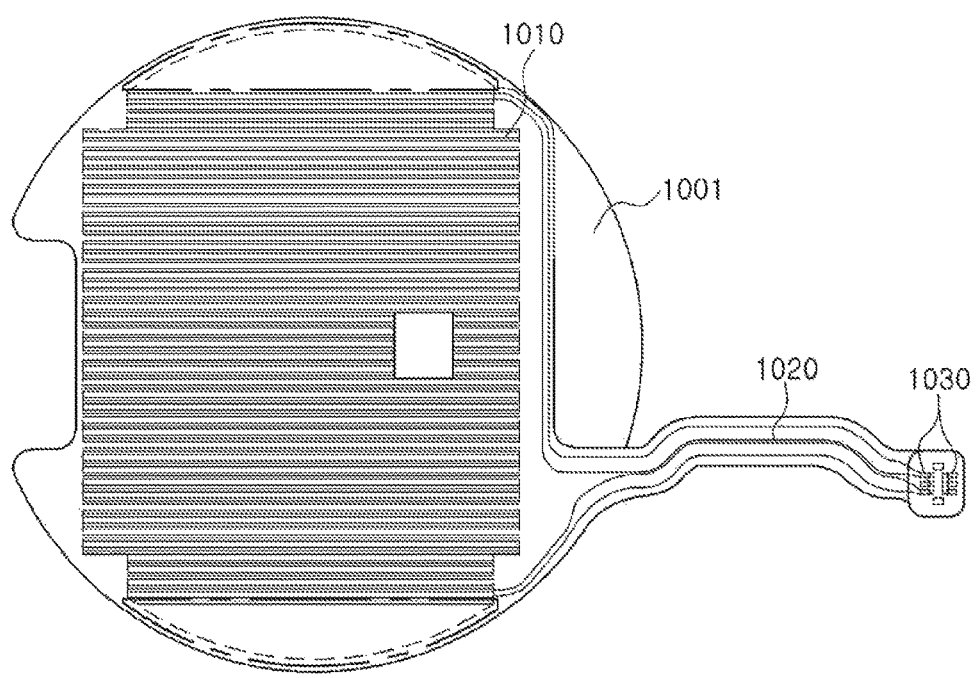
FIGS. 10A and 10B are views illustrating an example of a substrate layer included in the wireless communications antenna illustrated in FIG. 9.
Figure 10B:
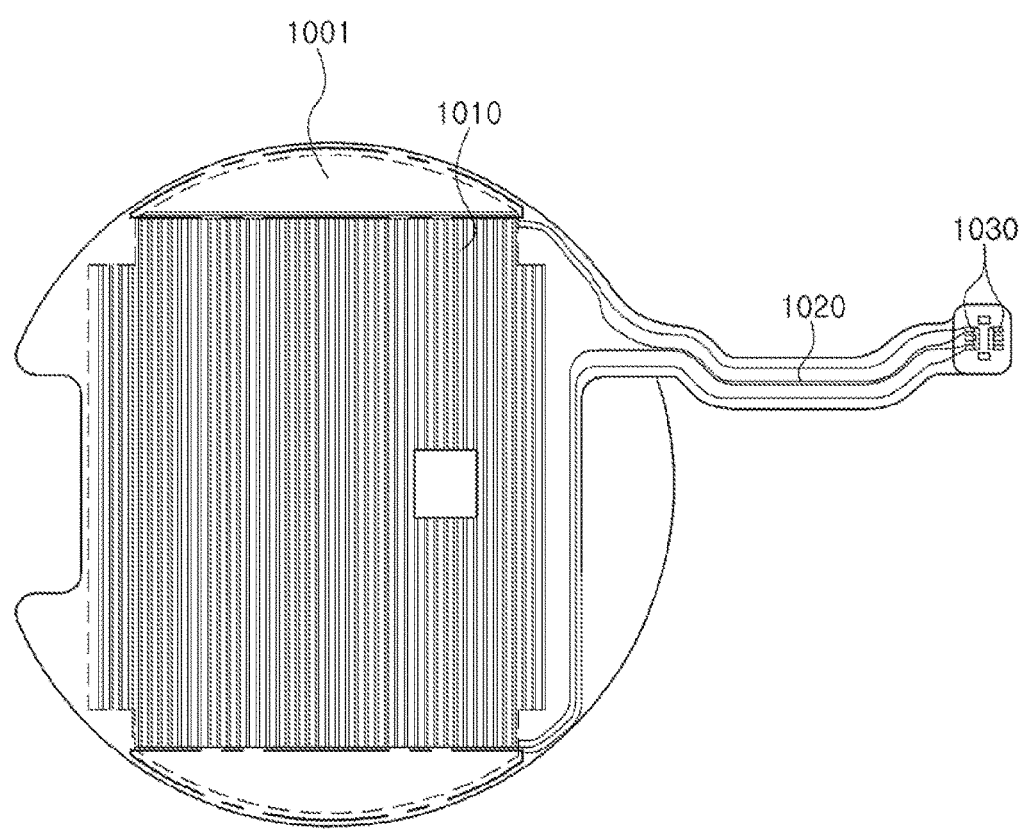

FIG. 9 is an exploded perspective view illustrating an example of a wireless communications antenna. FIGS. 10A and 10B are views illustrating an example of a substrate layer included in the wireless communications antenna illustrated in FIG. 9.

An example of the wireless communications antenna described with reference to FIGS. 9 to 10B is not mutually exclusive with an example of the wireless communications antenna of FIGS. 5 to 6B. Thus, descriptions overlapping those of the wireless communications antenna described above will be omitted.

With reference to FIGS. 9 to 10B, a substrate 1001 of the wireless communications antenna according to an example may have a shape allowing the substrate 1001 to be easily mounted in a wearable device.

For example, substrate layers 930 and 960 may have a circular shape, an oval shape, or a polygonal shape, while at least a portion thereof may have a concave portion or a convex portion.

A contact terminal 1030 to electrically connect a coil to a main substrate (450 illustrated in FIG. 4) is formed in such that the contact terminal 1030 protrudes from a substrate 901.

A shape of a magnetic material layer 950 may be varied according to a shape of substrates 930 and 960, and/or a length and an array of conductive patterns. In other words, the magnetic material layer 950 may have a circular shape, an oval shape, or a polygonal shape, while at least a portion thereof may have a concave portion or a convex portion.

According to a change in a shape of the magnetic material layer 950, a radiation direction and a radiation range of a magnetic field radiated by a solenoid coil may be adjusted.

Various examples of the wireless communications antenna according to an example have been described above.

Figure 11:
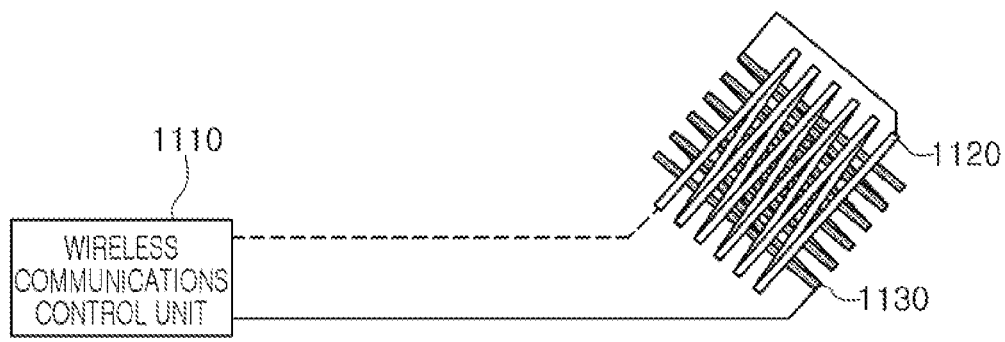
FIGS. 11, 12, and 13 are views illustrating various examples of wireless communications devices.

With reference to FIG. 11, the wireless communications device may include a wireless communications control unit 1110 and a wireless communications antenna.

The wireless communications control unit 1110 may control the wireless communications antenna to allow the wireless communications antenna to wirelessly transmit information by transmitting an information signal to the wireless communications antenna.

The wireless communications antenna includes a plurality of layers and includes a first coil 1120 and a second coil 1130 formed in the plurality of layers and formed based on different axes.

In shown in FIG. 11, since the first coil 1120 is connected to the second coil 1130 in series, the wireless communications antenna may transmit information within an entirety of a communications range of the first coil 1120 and the second coil 1130.

Figure 12:
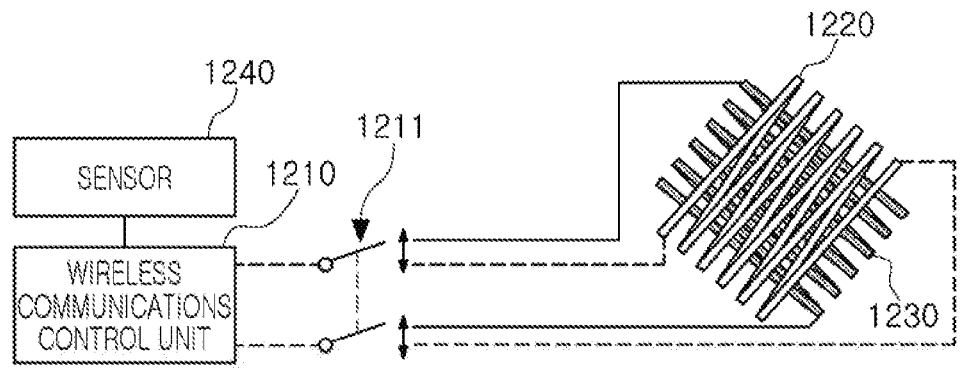

With reference to FIG. 12, the wireless communications device includes a wireless communications control unit 1210, a sensor 1240, and the wireless communications antenna.

The wireless communications control unit 1210 may control the wireless communications antenna to allow the wireless communications antenna to wirelessly transmit information by transmitting an information signal to the wireless communications antenna.

The wireless communications antenna includes a plurality of layers and includes a first coil 1220 and a second coil 1230 formed in the plurality of layers and formed based on different axes.

The first coil 1220 and the second coil 1230 are connected in parallel. The wireless communications control unit 1210 may select a coil transmitting information wirelessly through a sensor 1240 and may control a switch 1211 so that the coil, having been selected, may be connected to the wireless communications control unit 1210.

Figure 13:
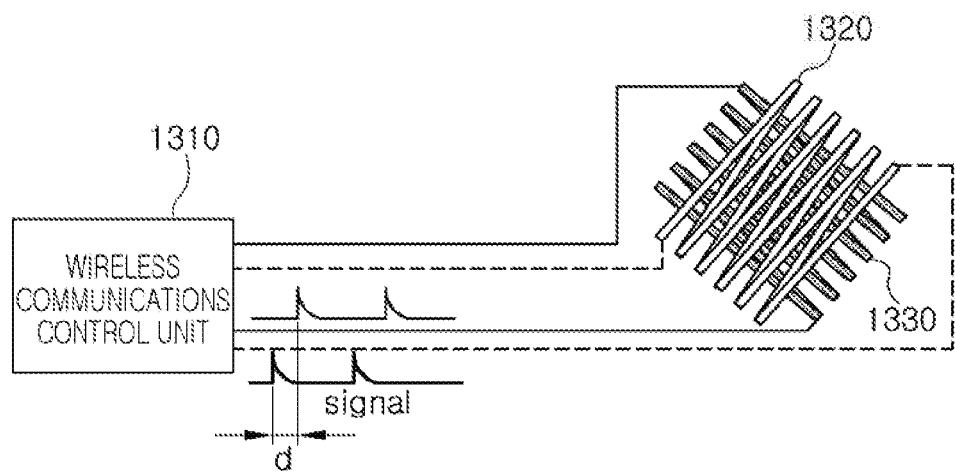

With reference to FIG. 13, the wireless communications device includes a wireless communications control unit 1310 and the wireless communications antenna.

The wireless communications control unit 1310 may control the wireless communications antenna to allow the wireless communications antenna to wirelessly transmit information by transmitting an information signal to the wireless communications antenna.

The wireless communications antenna includes a plurality of layers and includes a first coil 1320 and a second coil 1330 formed in the plurality of layers and respectively formed based on different axes.

The first coil 1320 and the second coil 1330 are connected to the wireless communications control unit 1310 independently of each other.

In an example, the wireless communications control unit 1310 transmits information by the first coil 1320, and after a specific time period, may retransmit the same information to the second coil 1330.

As set forth above, according to examples, a wireless communications antenna may be appropriate for a wearable device and may improve communications performance.

The wireless communications antenna described above may provide stable communications performance at various angles with respect to a wireless communications target device.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A wireless communications antenna, comprising:
    a first coil comprising first conductive patterns disposed on a first layer along a first axis;

a second coil comprising second conductive patterns disposed on a second layer along a second axis having a direction different from a direction of the first axis; and a magnetic material layer comprising a magnetic material, wherein the first layer is disposed on the magnetic material layer; and wherein the first coil further comprises:
third conductive patterns disposed on a third layer disposed below the magnetic material layer along the first axis; and
first via electrodes electrically connecting the first conductive patterns to the third conductive patterns.

2. The wireless communications antenna of claim 1, wherein:
the second layer is disposed under the magnetic material layer; and
the second coil further comprises:
fourth conductive patterns disposed on a fourth layer disposed on the magnetic material layer along the second axis; and
second via electrodes electrically connecting the second conductive patterns to the fourth conductive patterns.

3. The wireless communications antenna of claim 1, wherein the first coil is a solenoid coil using the magnetic material layer as a core.

4. The wireless communications antenna of claim 2, wherein the second coil is a solenoid coil using the magnetic material layer as a core.

5. The wireless communications antenna of claim 2, wherein the first axis is perpendicular to the second axis.

6. The wireless communications antenna of claim 2, wherein:
the first conductive patterns are disposed on an upper surface of a first substrate layer;
the fourth conductive patterns are disposed on a lower surface of the first substrate layer;
the second conductive patterns are disposed on an upper surface of a second substrate layer, the second substrate layer being disposed below the first substrate layer;
third conductive patterns are disposed on a lower surface of the second substrate layer; and
the magnetic material layer is disposed between the first substrate layer and the second substrate layer and comprises the magnetic material.

7. The wireless communications antenna of claim 2, wherein:
the first conductive patterns are disposed on an upper surface of a first substrate layer;
the fourth conductive patterns are disposed on a lower surface of the first substrate layer;
the third conductive patterns are disposed on an upper surface of a second substrate layer, the second substrate layer being disposed below the first substrate layer;
the second conductive patterns are disposed on a lower surface of the second substrate layer; and
the magnetic material layer is disposed between the first substrate layer and the second substrate layer and comprises the magnetic material.

8. A wireless communications device, comprising:
a wireless communications antenna comprising a first coil comprising first conductive patterns disposed on a first layer along a first axis and a second coil comprising second conductive patterns disposed on a second layer and formed along a second axis different from the first axis;
a wireless communications controller configured to control the wireless communications antenna to allow the wireless communications antenna to wirelessly transmit information by transmitting an information signal to the wireless communications antenna; and
a magnetic material layer comprising a magnetic material, wherein the first layer is disposed on the magnetic material layer; and
wherein the first coil further comprises:
third conductive patterns disposed on a third layer disposed below the magnetic material layer along the first axis; and
first via electrodes electrically connecting the first conductive patterns to the third conductive patterns.

9. The wireless communications device of claim 8, wherein a communications area configured to be formed by the first coil is different from a communications area configured to be formed by the second coil.

10. The wireless communications device of claim 8, wherein:
the second layer is disposed under the magnetic material layer; and
the second coil further comprises:
fourth conductive patterns disposed on a fourth layer disposed on the magnetic material layer along the second axis; and
second via electrodes electrically connecting the second conductive patterns to the fourth conductive patterns.

11. The wireless communications device of claim 10, wherein:
the first conductive patterns are disposed on an upper surface of a first substrate layer;
the fourth conductive patterns are disposed on a lower surface of the first substrate layer;
the second conductive patterns are disposed on an upper surface of a second substrate layer, the second substrate layer being disposed below the first substrate layer;
the third conductive patterns are disposed on a lower surface of the second substrate layer; and
the magnetic material layer is disposed between the first substrate layer and the second substrate layer and comprises the magnetic material.

12. The wireless communications device of claim 10, wherein:
the first conductive patterns are disposed on an upper surface of a first substrate layer;
the fourth conductive patterns are disposed on a lower surface of the first substrate layer;
the third conductive patterns are disposed on an upper surface of a second substrate layer, the second substrate layer being disposed below the first substrate layer;
the second conductive patterns are disposed on a lower surface of the second substrate layer; and
the magnetic material layer is disposed between the first substrate layer and the second substrate layer and comprises the magnetic material.

\* \* \* \* \*